United States Patent
Yamaguchi et al.

(10) Patent No.: US 7,956,970 B2
(45) Date of Patent: Jun. 7, 2011

(54) LIQUID CRYSTAL DISPLAY DEVICE

(75) Inventors: Minoru Yamaguchi, Hamura (JP);
Hiromitsu Ishii, Mitaka (JP)

(73) Assignee: Casio Computer Co., Ltd., Tokyo (JP)

( * ) Notice: Subject to any disclaimer, the term of this patent is extended or adjusted under 35 U.S.C. 154(b) by 923 days.

(21) Appl. No.: 11/862,037

(22) Filed: Sep. 26, 2007

(65) Prior Publication Data

US 2008/0074599 A1 Mar. 27, 2008

(30) Foreign Application Priority Data

Sep. 27, 2006 (JP) ................................ 2006-263227

(51) Int. Cl.
*G02F 1/1337* (2006.01)

(52) U.S. Cl. ............ 349/132; 349/38; 349/123; 349/43

(58) Field of Classification Search .................... 349/41, 349/42, 43, 45, 46, 56, 73, 74, 84, 95, 123, 349/125, 128, 130, 132, 139, 143, 155, 158, 349/160, 38

See application file for complete search history.

(56) References Cited

U.S. PATENT DOCUMENTS

| 5,309,264 | A | 5/1994 | Lien et al. |
| 6,661,488 | B1 | 12/2003 | Takeda et al. |
| 6,724,452 | B1 | 4/2004 | Takeda et al. |
| 7,167,224 | B1 | 1/2007 | Takeda et al. |
| 7,224,421 | B1 | 5/2007 | Takeda et al. |
| 7,227,606 | B2 | 6/2007 | Takeda et al. |
| 7,304,703 | B1 | 12/2007 | Takeda et al. |
| 2005/0088597 | A1 * | 4/2005 | Maeda et al. ................. 349/139 |
| 2006/0114405 | A1 * | 6/2006 | Yamaguchi et al. .......... 349/178 |
| 2008/0074599 | A1 * | 3/2008 | Yamaguchi et al. .......... 349/132 |
| 2008/0165314 | A1 | 7/2008 | Takeda et al. |

FOREIGN PATENT DOCUMENTS

| JP | 6-043461 A | 2/1994 |
| JP | 09-304757 A | 11/1997 |
| JP | 2001-235752 A | 8/2001 |
| JP | 2002-365638 A | 12/2002 |
| JP | 2003-029284 A | 1/2003 |
| JP | 2004-213036 A | 7/2004 |
| JP | 2005-338762 A | 12/2005 |

OTHER PUBLICATIONS

Japanese Office Action dated Jul. 1, 2008 (and English translation thereof) issued in counterpart Japanese patent application No. 2006-263227.

Japanese Office Action (and English translation thereof) dated Sep. 30, 2008, issued in a counterpart Japanese Application.

* cited by examiner

*Primary Examiner* — Brian M Healy

(74) *Attorney, Agent, or Firm* — Holtz, Holtz, Goodman & Chick, PC

(57) ABSTRACT

A liquid crystal display device provides, on the internal side of one substrate of a pair of substrates a plurality of pixel electrodes, a plurality of TFTs, a plurality of scan lines and signal lines, and a plurality of convex sections each formed on the internal side of the other substrate so as to be located substantially on a center part of each of the plurality of predetermined regions provided in each of the plurality of pixels. Further, the liquid crystal display device provides an opposing electrode on the internal side of the one substrate. Then, the liquid crystal display device provides vertical alignment films on the respective internal sides of the pair of substrates, and a liquid crystal layer having negative dielectric anisotropy and inserted in the gap between the pair of substrates.

28 Claims, 9 Drawing Sheets

LIQUID CRYSTAL DISPLAY DEVICE

BACKGROUND OF THE INVENTION

1. Field of the invention

The present invention relates to a vertically aligned liquid crystal display device.

2. Description of the related art

A vertically aligned liquid crystal display device provides a pair of substrates arranged opposite each other with a gap and a plurality of pixel electrodes aligned in a matrix shape on one of the mutually opposed internal sides of the pair of substrates. Additionally, this liquid crystal display device provides, on the internal side of the substrate on which the pixel electrodes are provided, a plurality of thin film transistors connected to their corresponding pixel electrodes, and a plurality of scan lines and signal lines that supply gate signals and data signals to the thin film transistors. Further, the liquid crystal display device provides an opposing electrode that forms a plurality of pixels from the plurality of pixel electrodes and respective opposing regions on the internal side of the other substrate, and a vertical alignment film on the respective internal sides of the pair of substrates. Then, this liquid crystal display device is configured so that a liquid crystal layer having negative dielectric anisotropy is interposed in the gap between the pair of substrates (Japanese Patent Publication No. 2565639).

For each pixel of a plurality of pixels comprising the region where the plurality of pixel electrodes and the opposing electrode are mutually opposed, the vertically aligned liquid crystal display device tilts in alignment the liquid crystal molecules from a vertically oriented state by applying voltage between the electrodes. The liquid crystal molecules of each pixel are aligned in such a manner that the molecules tilt toward the electrode surface when the voltage is applied.

However, with the conventional vertically aligned liquid crystal display device, the direction in which the crystal molecules tilt when voltage is applied is unstable. This results in variance in the tilted orientation of the liquid crystal molecules of each pixel, causing a problem of display graininess to arise in the conventional vertically aligned liquid crystal display device.

SUMMARY OF THE INVENTION

The liquid crystal display device as recited of the first present invention comprises:

a pair of substrates arranged opposite each other with a gap;

at least one opposing electrode formed on an internal side of one of the mutually opposed pair of substrates, a plurality of pixel electrodes aligned in a matrix shape on an internal side of the other substrate, the plurality of pixel electrodes having predefined regions, opposed to the opposing electrode and defining a plurality of pixels;

a plurality of thin film transistors associated with the plurality of pixel electrodes on the internal side of the other substrate, and the plurality of thin film transistors each connected to the corresponding pixel electrode;

a plurality of scan lines and signal lines on the internal side of the other substrate, supplying gate signals and data signals to the thin film transistor;

a plurality of convex sections each formed on the internal side of the other substrate so as to be located substantially on a center part of each of the plurality of predetermined regions provided in each of the plurality of pixels and protruding farther than the other regions of the pixel electrodes;

a vertical alignment film on the respective internal sides of the pair of substrates; and a liquid crystal layer, having negative dielectric anisotropy, and interposed in the gap between the pair of substrates.

The liquid crystal display device as recited of the second present invention comprises:

a pair of substrates arranged opposite each other with a gap;

at least one opposing electrode formed on an internal side of one of the mutually opposed pair of substrates, a plurality of pixel electrodes aligned in a matrix shape on an internal side of the other substrate, the plurality of pixel electrodes having predefined regions, opposed to the opposing electrode and defining a plurality of pixels;

a plurality of thin film transistors associated with the plurality of pixel electrodes on the internal side of the other substrate, and the plurality of thin film transistors each connected to the corresponding pixel electrode;

a plurality of scan lines and signal lines on the internal side of the other substrate, supplying gate signals and data signals to the thin film transistor;

a plurality of convex sections each formed on the internal side of the other substrate so as to be located substantially on a center part of each of the plurality of pixels made up of at least two films of the same materials as at least two of the plurality of films constituting a thin film transistor and protruding toward the one substrate farther than the other regions of internal side of each of the pixel electrodes;

a vertical alignment film on the respective internal sides of the pair of substrates; and a liquid crystal layer, having negative dielectric anisotropy, and interposed in the gap between the pair of substrates.

The liquid crystal display device as recited of the third present invention comprises:

a pair of substrates arranged opposite each other with a gap;

at least one opposing electrode formed on an internal side of one of the pair of opposed substrates, a plurality of pixel electrodes aligned in a matrix shape on the other of the mutually opposed internal sides of the pair of substrates, the plurality of pixel electrodes opposed to the opposing electrode and defining a plurality of pixels;

a plurality of thin film transistors associated with the plurality of pixel electrodes on the internal side of the other substrate, the plurality of thin film transistors each connected to the corresponding pixel electrode;

a plurality of scan lines and signal lines on an internal side of the other substrate and supplying gate signals and data signals to the thin film transistor;

a plurality of convex sections each located substantially on a center part of each of the plurality of pixels, having an area of predetermined ratio with respect to an area of the electrode, protruding toward the one substrate farther than the other regions of internal side of each of the pixel electrodes, and reflecting a light entering from an observation side;

a vertical alignment film on the respective internal sides of the pair of substrates; and a liquid crystal layer, having negative dielectric anisotropy, and interposed in the gap between the pair of substrates.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Embodiment 1

Figure 1:
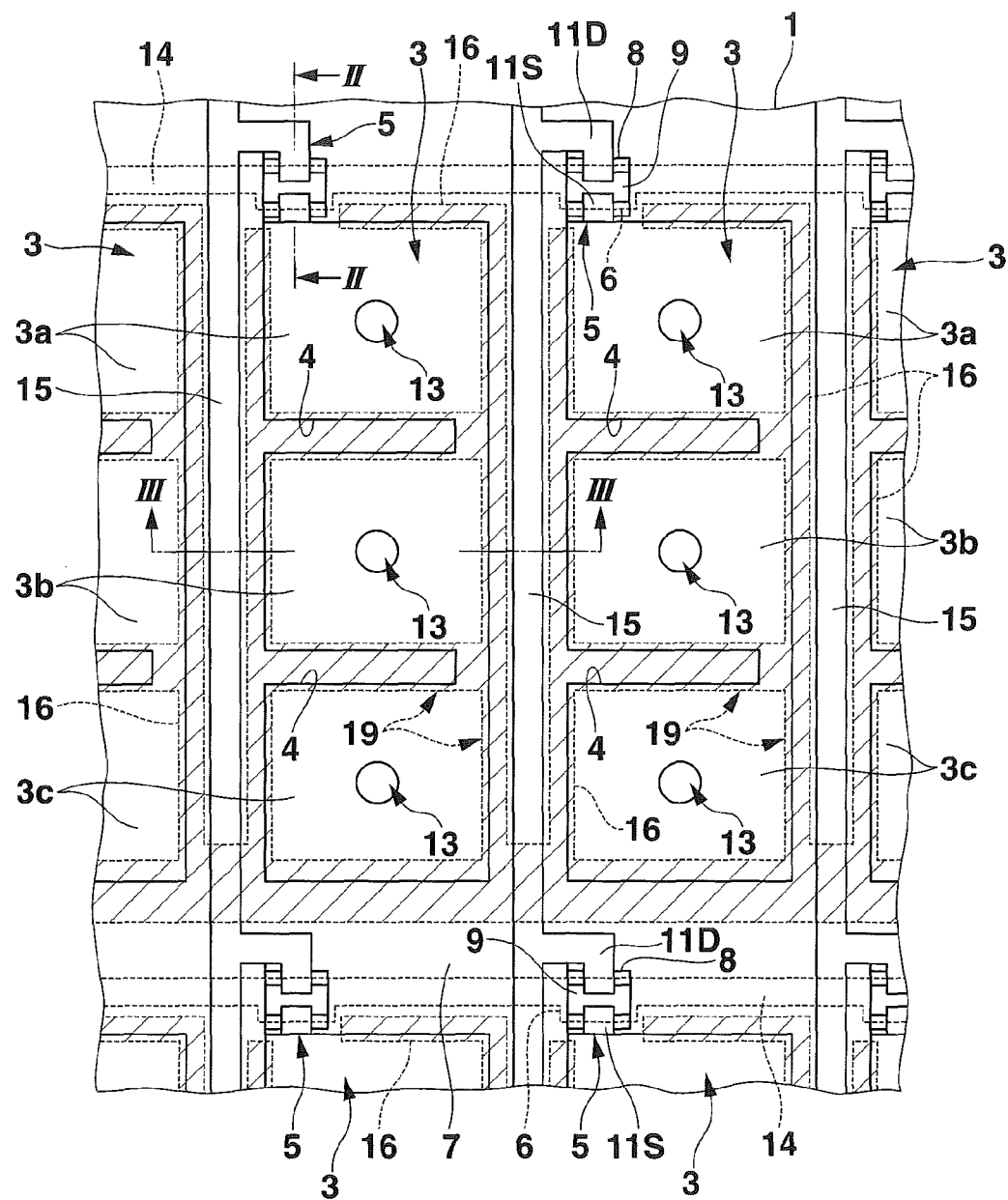
FIG. 1 is a plan view of one substrate of a liquid crystal display device according to Embodiment 1.
Figure 2:
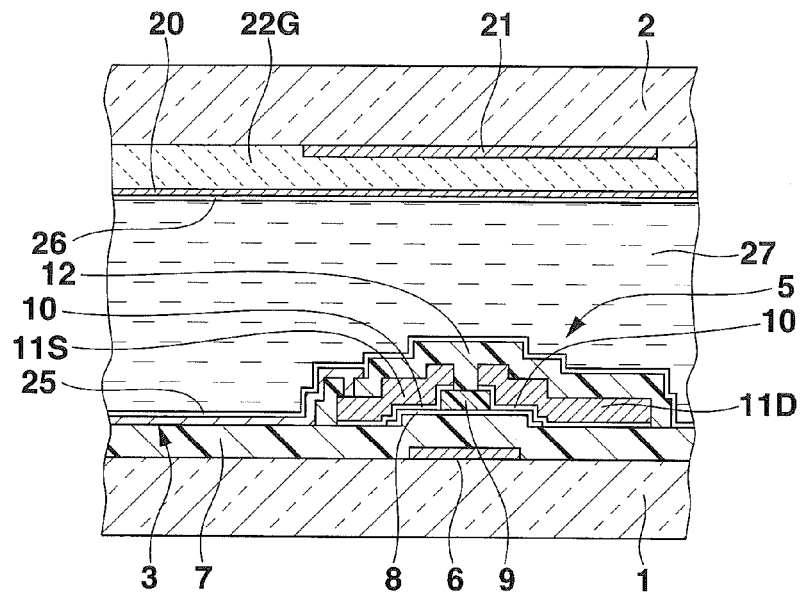
FIG. 2 is an enlarged view corresponding to line II-II of FIG. 1 of a liquid crystal display device according to Embodiment 1.
Figure 3:
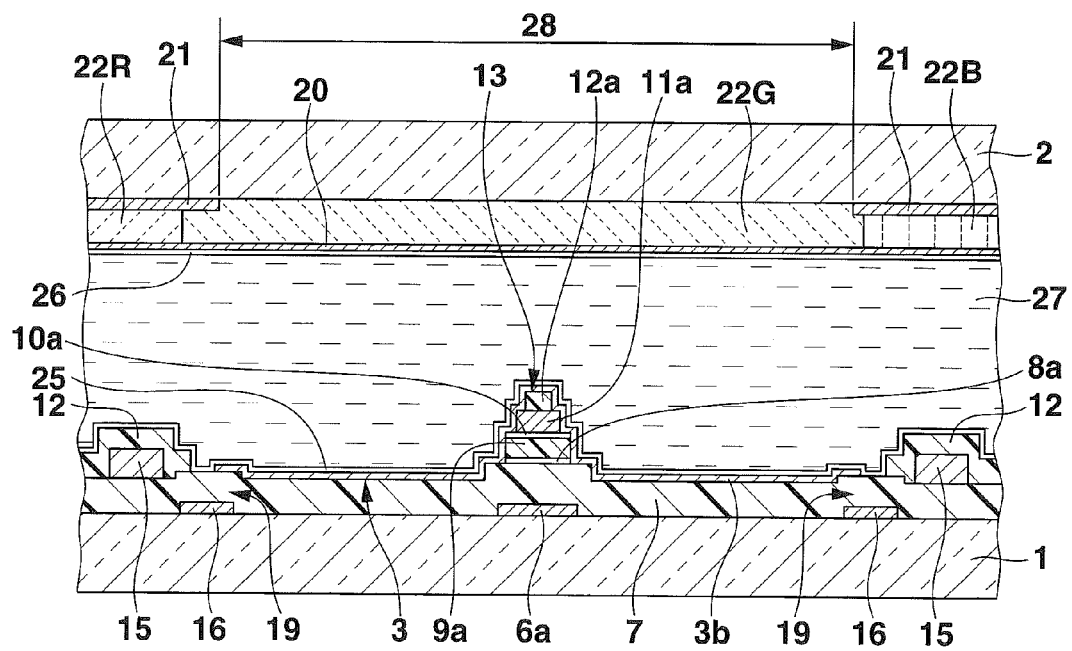
FIG. 3 is an enlarged view corresponding to line III-III of FIG. 1 of a liquid crystal display device according to Embodiment 1.

FIG. 1 to FIG. 6 illustrate Embodiment 1 of the present invention. FIG. 1 is a plan view of a section of one substrate of a liquid crystal display device, and FIG. 2 and FIG. 3 are enlarged cross-sectional diagrams of the liquid crystal display device corresponding to lines II-II and III-III of FIG. 1.

This liquid crystal display device is an active matrix liquid crystal display device having a thin film transistor (hereinafter "TFT") serving as the active element. As shown in FIG. 1 to FIG. 3, the liquid crystal display device comprises a pair of transparent substrates 1 and 2 arranged opposite each other with a predetermined gap, a plurality of transparent pixel electrodes 3, a plurality of TFTs 5, a plurality of convex sections 13, a plurality of scan lines 14 and signal lines 15, a transparent opposing electrode 20 of a single film shape, vertical alignment films 25 and 26, and a liquid crystal layer 27 having negative dielectric anisotropy. The plurality of transparent pixel electrodes 3 are aligned in a matrix shape in a row direction (horizontal direction of FIG. 1) and a column direction (vertical direction of FIG. 1) on one of the mutually opposed internal sides of the pair of substrates 1 and 2, such as, for example, the internal side of the substrate 1 (hereinafter after "back substrate") opposite the observation side (top side of FIG. 2 and FIG. 3) of the display. The plurality of TFTs 5 are associated with the plurality of pixel electrodes on the internal side of the other substrate, and each connected to the corresponding pixel electrode 3. The plurality of scan lines 14 and signal lines 15 are provided on the internal side of the back substrate 1, and supplies gate signals and data signals to the TFT 5. The plurality of convex sections are each located substantially on a center part of each of the plurality of pixels and protrude toward the one substrate farther than the other regions of the surface of each of the pixel electrodes. The opposing electrode 20 is formed on an internal side of the substrates 2, opposed to the respective center parts of the plurality of pixel electrodes 3, and defines a plurality of pixels. Vertical alignment films 25 and 26 are provided on the respective internal sides of the air of substrates 1 and 2. The liquid crystal layer 27 is interposed in the gap between the pair of substrates 1 and 2.

The TFT 5 comprises a gate electrode 6, a transparent gate insulating film 7, an i-type semiconductor film 8, a blocking insulating film 9, a drain electrode 11D and a source electrode 11S, and an overcoat insulating film 12. The gate insulating film 7 is formed on the substrate surface of the back substrate 1. The i-type semiconductor film 8 is formed on the entire alignment region of the pixel electrode 3, covering the gate electrode 6, and formed opposite the gate electrode 6 on top of the gate insulating film 7. The blocking insulating film 9 is formed above the center section that serves as the channel region of the i-type semiconductor film 8. The drain electrode 11D and the source electrode 11S are formed via the n-type semiconductor film 10 above one side section and he other side section of the i-type semiconductor film 8. The overcoat insulating film 12 is formed above the drain electrode 11D and the source electrode 11S. In FIG. 1, the overcoat insulating film 12 and the vertical alignment film 25 are omitted.

The plurality of scan lines 14 are integrated with the gate electrode 6 of the plurality of TFTs 5 respectively corresponding to the plurality of pixel electrodes 3 of each row, along the one side per pixel electrode row, on the board surface of the back substrate 1.

Further, the signal lines 15 are integrated with the drain electrode 1 ID of the plurality of TFTs 5 respectively corresponding to the plurality of pixel electrodes 3 of each column, along one side section per pixel electrode column, above the gate insulating film 7. The signal line 15 is covered by the overcoat insulating film 12 of the TFT 5.

Then, the plurality of pixel electrodes 3 is formed above the gate insulating film 7, with the TFT connection section of the pixel electrode 3 overlapping the overcoat insulating film 7. The plurality of pixel electrodes 3 are connected to the source electrode 11S of the TFT 5 at a connecting hole provided on the overcoat insulating film 12.

Each of the plurality of pixel electrodes 3 comprises a transparent electrode film such as an ITO (Indium Tin Oxide) film, etc., that is formed into a long and narrow rectangular shape having a width in the row direction that is substantially 1 portion of an integer, such as ⅓, for example, of the width in the column direction, and on which is provided a slit 4 that substantially divides the rectangular shape into a plurality (three in the present illustration) of square-shaped electrode segments 3a, 3b, and 3c aligned in the longitudinal direction thereof. The convex section 13 is provided correspondingly to the center sections of the three electrode segments 3a, 3b, and 3c (the center sections of the square shapes) of the pixel electrode 3 that are substantially formed into square shapes (hereinafter "square-shaped electrode segments").

Furthermore, the slit 4 of the pixel electrode 3 is provided in parallel with the row direction, from near one side border to the other side border of the pixel electrode 3. Each of the electrode segments 3a, 3b, and 3c is interconnected in the area between one side border of the pixel electrode 3 and an end section of the slit 4.

The convex section 13 comprises a layered film made of film of the same material as all or a portion of the plurality of films 6, 7, 8, 9, 10, 11D and 11S, and 12 constituting the TFT 5.

In the present embodiment, the convex section 13 is formed from the films of the same material as all of the plurality of films constituting the TFT 5, that is, a lower metal film 6a, the gate insulating film 7, a lower semiconductor film 8a, an intermediate insulating film 9a, an upper semiconductor film 10a, an upper insulating film 12a, and an upper insulating film 12a. The lower metal film 6a comprises a metal film of the same material as the gate electrode 6 and the scan line 14. The lower semiconductor film 8a, the intermediate insulating film 9a, and the upper semiconductor film 10a comprise semiconductor films and an insulating film of the same material as the i-type semiconductor film 8, the blocking insulating film 9, and the n-type semiconductor film 10. The upper insulating film 12a comprises a metal film of the same material as the drain electrode 11D and the source electrode 11S. The upper insulating film 12a comprises an insulating film of the same material as the overcoat insulating film.

Furthermore, the gate insulating film 7 of the layered film forming the convex section 13 is formed on the entire alignment region of the plurality of pixel electrodes 3. In consequence, the convex section 13 protrudes at a height corresponding to the total value of each film thickness of the lower metal film 6a, the lower semiconductor film 8a, the intermediate insulating film 9a, the upper semiconductor film 10a, the upper metal film 11a, and the upper insulating film 12a, with respect to the substrate internal side corresponding to the other regions of the pixel electrode 3, that is, with respect to the film surface of the regions corresponding to the pixel electrode 3 of the gate insulating film 7 other than the region corresponding to the convex section 13.

Further, in the present embodiment, the lower metal film 6a is formed into a circular film of a predetermined diameter; and the diameter of the three-layer film comprising the lower semiconductor film 8a, the intermediate insulating film 9a, and the upper semiconductor film 10a, the diameter of the upper metal film 11a, and the diameter of the upper insulating film 12a gradually decrease at a predetermined rate with respect to the diameter of the bulging section above the lower metal film 6a of the gate insulating film 7. As a result, the convex section 13 is substantially formed into a flat top conical shape, having a circular (planar) shape and a diameter that gradually decreases from the bottom to the top (a flat top conical shape having a stepped peripheral surface).

Then, the pixel electrode 3 is formed above the gate insulating film 7 into a shape in which the section corresponding to the convex section 13 protrudes farther than the sections other than the convex section 13 (the sections formed on the gate insulating film 7), covering the convex section 13. Then, the vertical alignment film 25 is formed above the pixel electrode 3, across the entire alignment region of the plurality of pixel electrodes 3.

Further, a capacitive electrode 16 that forms a compensation capacitor 19 with the plurality of pixel electrodes 3 is further formed on the internal side of the back substrate 1. In FIG. 1, to make the capacitive electrode 16 easily distinguishable, the section corresponding to the capacitive electrode 16 is shaded using parallel diagonal lines.

This capacitive electrode 16 comprises a transparent conductive film of ITO film, for example, and is formed correspondingly to the peripheral border section and the slit 4, excluding the TFT connection section of the pixel electrode 3, on the board surface of the back substrate 1. Further, the capacitive electrode 16 is arranged opposite the peripheral border sections of the three square-shaped electrode segments 3a, 3b, and 3c of the pixel electrode 3 via the gate insulating film 7, and forms with the pixel electrode 3 the compensation capacitor 19 having the gate insulating film 7 as a dielectric layer.

Furthermore, the capacitive electrode 16 is arranged so that the inner peripheral border section of the frame shape section corresponding to the peripheral border section of the pixel electrode 3 is opposite the peripheral border section of the pixel electrode 3, and the outer peripheral border section of the frame shape section extends lateral to the pixel electrode 3. Further, the capacitive electrode 16 is formed at a width such that both side border sections of the section corresponding to the slit 4 are arranged opposite the neighboring border sections of each of the square-shaped electrodes 3a, 3b, and 3c of the pixel electrode 3. The compensation capacitor 19 is formed by the section opposite the pixel electrode 3 of the capacitive electrode 16.

Then, the capacitive electrode 16 respectively corresponding to the plurality of pixel electrodes 3 is integrated on the side opposite the TFT connection side of the pixel electrode 3 per pixel electrode row. Furthermore, the capacitive electrode 16 of each row is commonly connected to a capacitive electrode connection line (not shown) provided in parallel with the signal line 15 on one or both ends of the outside of the alignment region of the plurality of pixel electrodes 3.

On the other hand, a light shielding film 21, which is arranged opposite the region between the plurality of pixels 28 comprising a region opposite the opposing electrode 20 provided on the inner section of the front substrate 2 and the plurality of pixel electrodes 3 provided on the internal side of the back substrate 1, is provided on the internal side of the front surface 2. Further, three red, green, and blue color filters 22R, 22G, and 22B respectively corresponding to the plurality of pixels 28 are provided on the internal side of the front substrate 2, with the opposing electrode 20 formed above the color filters 22R, 22G, and 22B. Then, a vertical alignment film 26 is formed above the opposing electrode 20.

Then, the pair of substrates 1 and 2 is joined via a sealing material of a frame shape (not shown) surrounding the alignment region of the plurality of pixel electrodes 3. Then, the liquid crystal layer 27 comprising nematic liquid crystal having negative dielectric anisotropy is interposed in the gap surrounded by the sealing material between these substrates 1 and 2.

Furthermore, the back substrate 1 has an extending section (not shown) at one end section or both end sections in the row direction and column direction, protruding lateral to the front substrate 2. The plurality of scan lines 14 and signal lines 15 are respectively connected to a plurality of driver connection terminals aligned on the extending section. The capacitive electrode connection line to which the capacitive electrode 16 of each row is commonly connected is connected to a capacitive electrode connection line aligned along with the plurality of driver connection terminals on the extending section.

Furthermore, an opposing electrode connection line connected to an opposing electrode terminal (may be the same as or different from the capacitive electrode terminal) leading from near the angle section of the substrate joining section joined by the sealing material to the extending section and aligned with the driver connection terminal is provided on the internal side of the back substrate 1. The opposing electrode 20 provided on the internal side of the front substrate 2 is connected to the opposing electrode connection line at the substrate joining section, and to the opposing electrode terminal via this opposing electrode connection line.

Further, although omitted in the figure, the liquid crystal display device comprises a pair of polarizing plates respectively arranged on the outer surface of the pair of substrates 1 and 2. Furthermore, the liquid crystal display device is, for example, a normally black mode device in which the display appears black when voltage is not applied between the pixel electrode 3 and the opposing electrode 20. The pair of polarizing plates of the liquid crystal display device is arranged substantially orthogonal to the respective transmissive axes.

The liquid crystal display device tilts in alignment the liquid crystal molecules from the vertically oriented state by applying voltage between the electrodes 3 and 20 per pixel of the plurality of pixels 28 comprising a region where the plurality of pixel electrodes 3 and the opposing electrode 20 are mutually opposed. The liquid crystal molecule of each pixel 28 is oriented so that the molecule tilts toward the center section from the border section of the pixel 28 when voltage is applied.

Figure 4:
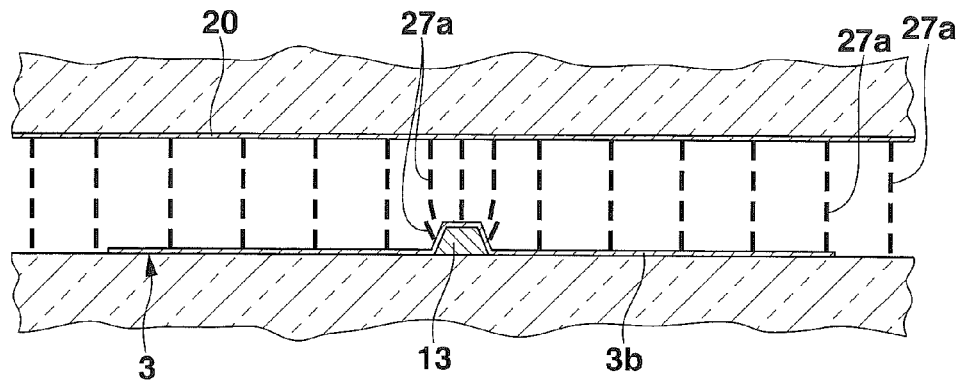
FIG. 4 is an exemplary cross-sectional diagram showing the orientation state of liquid crystal molecules when voltage is not applied in a liquid crystal display device according to Embodiment 1.
Figure 5:
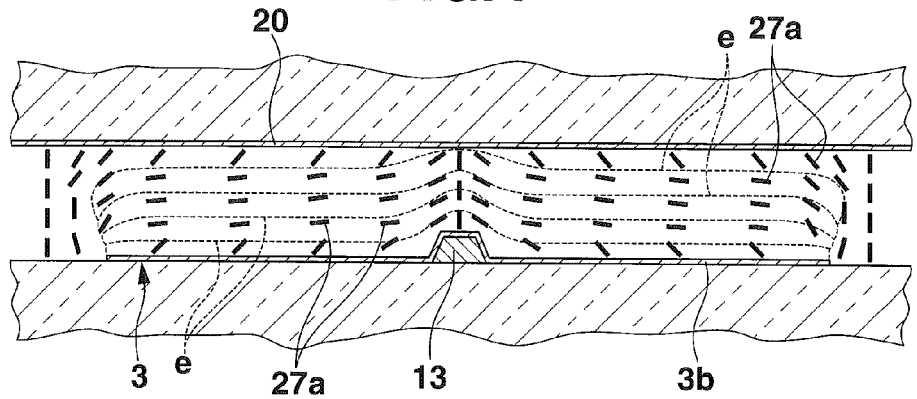
FIG. 5 is an exemplary cross-sectional diagram showing the orientation state of liquid crystal molecules when voltage is applied in a liquid crystal display device according to Embodiment 1.
Figure 6:
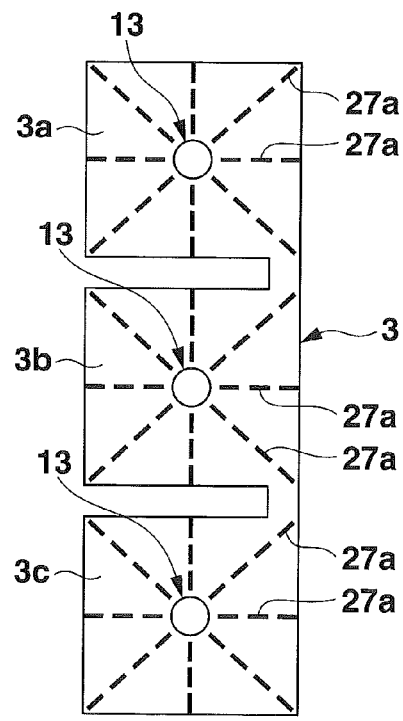
FIG. 6 is an exemplary cross-sectional diagram showing the orientation state of liquid crystal molecules when voltage is applied in a liquid crystal display device according to Embodiment 1.

FIG. 4 is an exemplary cross-sectional diagram showing the orientation state of the liquid crystal molecule when voltage is not applied between the electrodes 3 and 20 of a single pixel 28 of the liquid crystal display device. FIG. 5 is an exemplary cross-sectional diagram showing the orientation state of the liquid crystal molecule when voltage is applied between the electrodes 3 and 20 of the single pixel 28. FIG. 6 is an exemplary plan view showing the orientation state of the liquid crystal molecule when voltage is applied between the electrodes 3 and 20 of the single pixel 28. Furthermore, in FIG. 4 and FIG. 5, the convex section 13 is omitted.

As shown in FIG. 4, when voltage is not applied between the electrodes 3 and 20, a liquid crystal molecule 27a of the liquid crystal layer 27 is substantially vertically oriented with respect to the surfaces of the substrates 1 and 2 in regions other than the section corresponding to the convex section 13 due to the vertical orientation of the vertical alignment films 25 and 26 respectively provided on the internal sides of the pair of substrates 1 and 2. At this time, in the section corresponding to the convex section 13, he liquid crystal molecule 27a near the curved section 13 of the back substrate 1 side is oriented so that its long molecular axis is substantially toward the vertical direction with respect to the top surface and peripheral surface of the convex section 13, and the liquid crystal molecule 27a near the front substrate 2 is substantially vertically oriented with respect to the surface of the front substrate 2.

Then, the liquid crystal display device forms each of the plurality of pixel electrodes 3 on a conductive film that is formed into a long and narrow rectangular shape and on which the slit 4 that substantially divides the rectangular shape into the plurality of (three) square-shaped electrode segments 3a, 3b, and 3c aligned in the longitudinal direction is provided. Further, the liquid crystal display device provides the convex section 13 corresponding to the respective center sections of the plurality of square-shaped electrode segments 3a, 3b, and 3c of the pixel electrode 3, on the internal side of the back substrate 1 on which the plurality of pixel electrodes 3 is provided. As a result, when voltage is applied between the electrodes 3 and 20, the liquid crystal molecule 27a of each region respectively corresponding to the plurality of square-shaped electrode segments 3a, 3b, and 3c of the pixel electrode 3 is guided by the electrical potential distribution near the convex section 13 and the behavior of the liquid crystal molecules in the surrounding area of each pixel section. As a result, as shown in FIG. 5 and FIG. 6, for each of the regions, he liquid crystal molecule 27a stably tilts toward the center section from the peripheral order section of that region.

That is, the liquid crystal display device forms the pixel electrode 3, covering the convex section 13. Accordingly, the electric fields respectively generated in each region corresponding to each of the square-shaped electrode segments 3a, 3b, and 3c of the pixel electrode 3 when voltage is applied between the pixel electrodes 3 and 20 are electric fields where the electric potential of the section corresponding to the convex section 13, with respect to the electric potential of other sections of the region, is biased toward the front substrate 2 side, as the equipotential line e shows in FIG. 5.

As a result, the liquid crystal molecule 27a, per region corresponding to each of the square-shaped electrode segments 3a, 3b, and 3c of the pixel electrode 3, stably tilts toward the center section from the peripheral border section of the region along the equipotential line e, with the center section of the convex section 13 as the focal point of he tilting direction.

In this manner, the liquid crystal display device provides a plurality of convex sections 13 each formed on the internal side of the other substrate so as to be located substantially on a center part of each of the plurality of pixels and protruding farther than the other regions of the surface of each of the pixel electrodes 3, on the internal side of the back substrate 1 of the pair of substrates 1 and 2. As a result, per pixel of the plurality of pixels 28 comprising the region where the plurality of pixel electrodes 3 and the opposing electrode 20 provided on the internal side of the front substrate 2 are mutually opposed, the liquid crystal display device stably tilts the liquid crystal molecule 27a of the liquid crystal layer 27 having negative dielectric anisotropy characteristics and interposed in the gap between the pair of substrates 1 and 2 toward the center section from the border section of the pixel 28, when voltage is applied between the pixel electrodes 3 and 20. This makes it possible for the liquid crystal display device to display a good quality image without graininess.

Additionally, the liquid crystal display device forms the pixel electrode 3, covering he convex section 13. This makes it possible for the liquid crystal display device to even more stably tilt the liquid crystal molecule 27a toward the center section from the border section of the pixel 28 when the voltage is applied, and thereby display an image of even higher quality.

Further, the liquid crystal display device has the plurality of pixel electrodes 3 formed into a narrow rectangular shape, and comprises a conductive film segmented into substantially square-shaped electrode segments 3a, 3b and 3c. Then, the liquid crystal display device provides the convex section 13 formed on the internal side of the other substrate, located substantially on a center part of each of the electrode segments 3a, 3b and 3c. This makes it possible for the liquid crystal display device to stably tilt per region corresponding to the plurality of electrode segments 3a, 3b, and 3c of the pixel electrode 3 the liquid crystal molecule 27a toward the center section from that border section when the voltage is applied. Further, the liquid crystal display device achieves a state of stable orientation even in a case where the horizontal to vertical ratio of the pixel electrode is increased to improve the resolution of the screen.

Further, the liquid crystal display device forms the convex section 13 from film of the same material as all films 6, 7, 8, 9, 10, 11, 11D and 11S, and 12 constituting the TFT 5, that is, the layered film of the lower metal film 6a, the gate insulating film 7, the lower semiconductor film 8, the intermediate insulating film 9a, the upper semiconductor film 10a, the upper metal film 11a, and the upper insulating film 12a. The lower metal film 6a comprises a metal film of the same material as the gate electrode 6 and the scan line 14. The lower semiconductor film 8a, the intermediate insulating film 9a, and the upper semiconductor film 10a comprise semiconductor films and an insulating film of the same material as the i-type semiconductor film 8, the blocking insulating film 9, and the n-type semiconductor film 10. The upper metal film 11a comprises a metal film of the same material as the drain electrode 11D and the source electrode 11S. The upper insulating film 12a comprises an insulating film of the same material as the overcoat insulating film 12. The liquid crystal display device forms the convex section 13 from a layered film made of films of the same material as all films constituting the TFT 5, thereby making it possible to form the convex section 13 utilizing the formation process of the TFT 5, without any increase in the production cost of the liquid crystal display device.

Furthermore, in the above-described embodiment, the liquid crystal display device forms the convex section 13 from a layered film made of the films 6a, 7, 8a, 9a, 10a, 11a, and 12a, which are of the same material as all films constituting the TFT 5. Note, however, that the liquid crystal display device may form the convex section 13 from a layered film made of films of the same material as a portion of the plurality of films constituting the TFT 5, such as, for example, the lower metal film 6a, the gate insulating film 7, and the upper metal film 12a.

Embodiment 2

Figure 7:
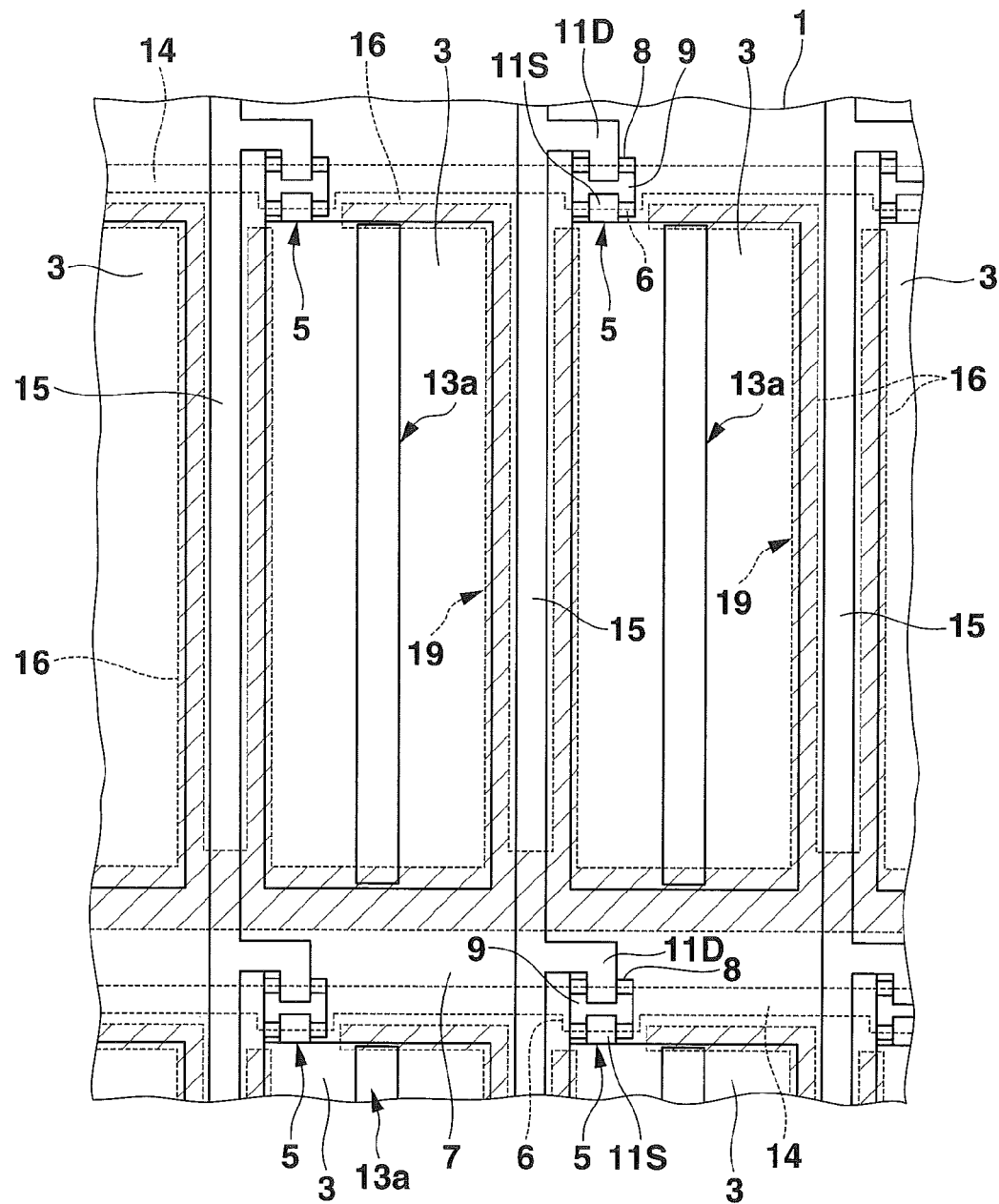
FIG. 7 is a plan view of a back substrate of a liquid crystal display device according to Embodiment 2.
Figure 8:
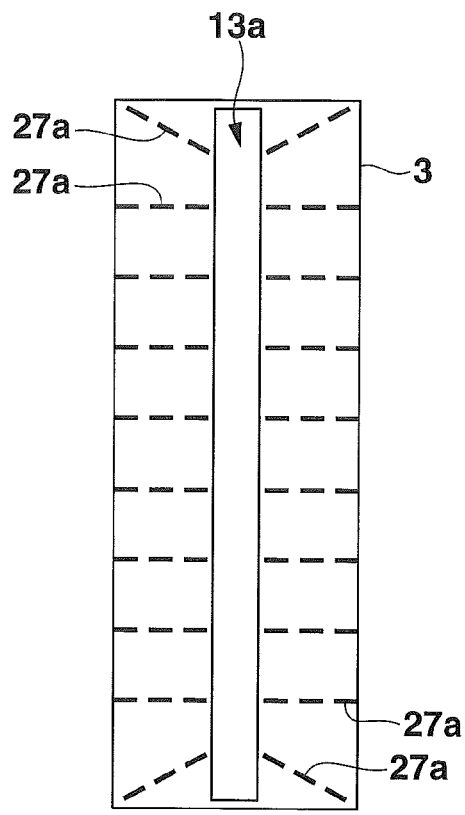
FIG. 8 is an exemplary plan view showing the orientation state of liquid crystal molecules when voltage is applied in a liquid crystal display device according to Embodiment 2.

FIG. 7 and FIG. 8 illustrate Embodiment 2 of the present invention. FIG. 7 is a plan view of a section of the other substrate (back substrate) of a liquid crystal display device, and FIG. 8 is an exemplary plan view showing the orientation state of liquid crystal molecules when voltage is applied between the electrodes of a single pixel of the liquid crystal display device of this embodiment. Furthermore, FIG. 7 uses the same callouts as the above-described Embodiment 1 for those items corresponding to the above-described Embodiment 1, and descriptions thereof are omitted.

The liquid crystal display device of the present embodiment forms the plurality of pixel electrodes 3 from a transparent conductive film formed into a long and narrow rectangular shape, and provides correspondingly to the surrounding area, excluding the TFT connection section of the pixel electrode 3, the capacitive electrode 16 that forms the compensation capacitor 19. Further, the liquid crystal display device of the present embodiment provides a long and narrow convex section 13a across the entire length in the longitudinal direction of the pixel electrode 3, correspondingly to the respective center sections of the plurality of pixel electrodes 3, on the internal side of the back substrate 1 provided with the plurality of pixel electrodes 3. The other components and the configuration of the cross-section of the convex section 13a are the same as those of Embodiment 1.

This liquid crystal display device provides the convex section 13a across the entire length in the longitudinal direction of the pixel electrode 3, correspondingly to the center section in the narrow width direction of the pixel electrode 3. This makes it possible for he liquid crystal display device to stably tilt the liquid crystal molecule 27a toward the center section from the border section of both sides in the longitudinal direction of the pixel 28, as in FIG. 8, when voltage is applied between the electrodes 3 and 20, and thereby display a good quality image without graininess. Further, the liquid crystal display device achieves a state of stable orientation even in a case where the horizontal to vertical ratio of the pixel electrode is increased to improve the resolution of the screen.

Embodiment 3

Figure 9:
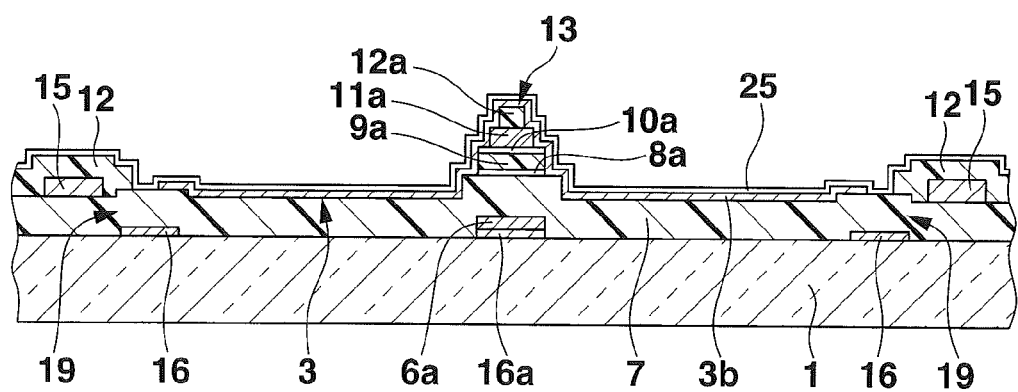
FIG. 9 is a cross-sectional diagram of a back substrate of a liquid crystal display device according to Embodiment 3.

FIG. 9 is a cross-sectional diagram of a section of the other substrate (back substrate) of the liquid crystal display device indicated in Embodiment 3 of the present invention. Furthermore, FIG. 9 uses the same callouts as the above-described Embodiment 1 for those items corresponding to the above-described Embodiment 1, and descriptions thereof are omitted.

The present embodiment forms in the liquid crystal display device of the above-described Embodiment 1 the convex section 13a from a layered film made of a conductive film 16a and a layered film made of films of the same material as all or a portion of the plurality of films 6, 7, 8, 9, 10, 11D and 11S, and 12 constituting the TFT 5 (in the figure, a layered film made of the films 6a, 7, 8a, 9a, 10a, 11a, and 12a of the same material as all of the plurality of films constituting the TFT 5). The conductive film 16a comprises a transparent conductive film of the same material as the compensation electrode 16 that forms the compensation capacitor 19. According to the present embodiment, the liquid crystal display device can form the convex section 13a utilizing the TFT 5 and the compensation capacitor 19 formation process, without increasing the production cost of the liquid crystal display device.

Furthermore, in the present embodiment, the conductive film 16 comprising a transparent conductive film of the same material as the capacitive electrode 16 is formed on the board surface of the back substrate 1, and the lower metal film 6a comprising a metal film of the same material as the gate electrode 6 and the scan line 14 of the TFT 5 is formed thereabove. Note, however, that the lower metal film 6a may be formed on the board surface of the back substrate 1 and the conductive film 16a may be formed hereabove, as in the variation example of Embodiment 3 shown in FIG. 10.

Further, Embodiment 3 and the variation example thereof may also be applied to the convex section 13a of the above-described Embodiment 2.

Embodiment 4

Figure 11:
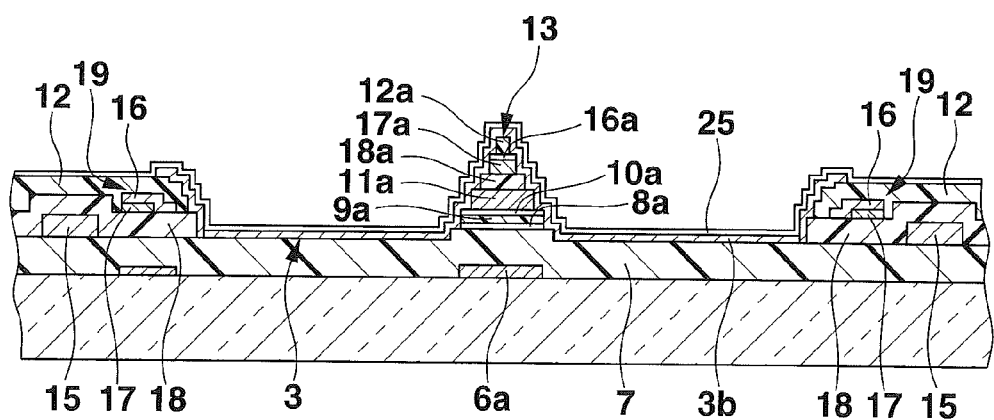
FIG. 11 is a cross-sectional diagram of a back substrate of a liquid crystal display device according to Embodiment 4.

FIG. 11 is a cross-sectional diagram of a section of the other substrate (back substrate) of the liquid crystal display device indicated in Embodiment 4 of the present invention. Furthermore, FIG. 11 uses the same callouts as the above-described Embodiment 1 for those items corresponding to the above-described Embodiment 1, and descriptions thereof are omitted.

The liquid crystal display device of the present embodiment provides the plurality of TFTs 5 between the drain electrode 11D & the source electrode 11S and the overcoat insulating film 12, and a transparent protective insulating film 18 above and across the signal line 15 from the TFT section. The liquid crystal display device forms the capacitive electrode 16 comprising a transparent protective conductive film of an ITO film, etc., above the side border section of the section covering the signal line 15 of the protective insulating film 18. Further, the liquid crystal display device forms the overcoat insulating film 12 at a width covering roughly the entire protective insulating film 18 above and across the signal line 15 from the TFT section, and forms a pixel electrode 3 having a border section that overlaps the border section of the overcoat insulating section 12. With this configuration, the liquid crystal display device forms the compensation capacitor 19 having the overcoat insulating film 12 as a dielectric layer, between the capacitive electrode 16 and the border section of the pixel electrode 3. In the present embodiment, the liquid crystal display device uses as the capacitive electrode 16 a double-layer film electrode in which a low resistance film 17 comprising a metal film is laminated on the outer peripheral border section extending lateral to the pixel electrode 3 and across the entire circumference thereof and the connecting section of the neighboring capacitive electrodes 16 and 16.

Furthermore, while in FIG. 11 the low resistance film 17 is formed above the protective insulating film 18 and the capacitive electrode 16 is formed thereabove, conversely the capacitive electrode 16 may be formed above the protective insulating film 18 and the low resistance film 17 may be formed thereabove.

Then, in the present embodiment, the liquid crystal display device provides on the internal side of the back substrate 1 provided with a plurality of pixel electrodes 3a, correspondingly to the center section of the plurality of square-shaped electrode segments 3a, 3b, and 3c of the pixel electrode 3, a convex section 13 substantially formed into a flat top conical shape (a flat top conical shape having a stepped peripheral surface) comprising a layered film made of films of the same material as all of the plurality of films constituting the TFT 5, that is, the lower metal film 6a, the lower semiconductor film 8a, the intermediate insulating film 9a, the upper semiconductor film 10a, the upper metal film 11a, and the upper insulating film 12a, and films of the same material as the capacitive electrode 16 wherein the low resistance film 17 is laminated, that is the intermediate metal film 17a and the conductive film 16a. The liquid crystal display device forms the pixel electrode 3 above the convex section 13. The lower metal film 6a comprises a metal film of the same material as the gate electrode 6 and the scan line 14. The lower semiconductor film 8a, the intermediate insulating film 9a, and the upper semiconductor film 10a comprise semiconductor films and an insulating film of the same material as the i-type semiconductor film 8, the blocking insulating film 9, and the n-type semiconductor film 10. The upper metal film 11 a comprises a metal film of the same material as the drain electrode 11D and the source electrode 11S. The upper insulating film 12a comprises an insulating film of the same material as the overcoat insulating film 12. The intermediate metal film 17a comprises a metal film of the same material as the low resistance film 17. The conductive film 16a comprises a transparent conductive film of the same material as the capacitive electrode 16.

The liquid crystal display device of the present embodiment provides the convex section 13 comprising a layered film made of films 6a, 7, 8a, 9a, 10a, 11a, 17a, and 12a of the same material as all of the plurality of films constituting the TFT 5, and the films 17a and 16a of the same material as the capacitive electrode 16 wherein the low resistance film 17 is laminated. This makes it possible for the liquid crystal display device to form the convex section 13 utilizing the TFT 5 and the compensation capacitor 19 formation process, without increasing the production cost of the liquid crystal display device.

Furthermore, in the present embodiment, the convex section 13 is formed from a layered film made of the films 6a, 7, 8a, 9a, 10a, 11a, 12a, 18a, 17a, and 12a of the same material as all of the plurality of films constituting the TFT 5, and the films 17a and 16a of the same material as the capacitive electrode 16 wherein the low resistance film 17 is laminated. Note, however, that the convex section 13 may be formed from a layered film made of all or a portion of films of the same material as the plurality of films constituting the TFT 5, such as, for example, the lower metal film 6a, the gate insulating film 7, the upper metal film 11a, the second intermediate insulating film 18a, and the upper insulating film 12a, and films 17a and 16a of the same material as the capacitive electrode 16 wherein the low resistance film 17 is laminated.

Further, the construction of the formation of the compensation capacitor 19 and the convex section 13 of the present embodiment may also be applied to the above-described Embodiment 2 as well.

Embodiment 5

Figure 12:
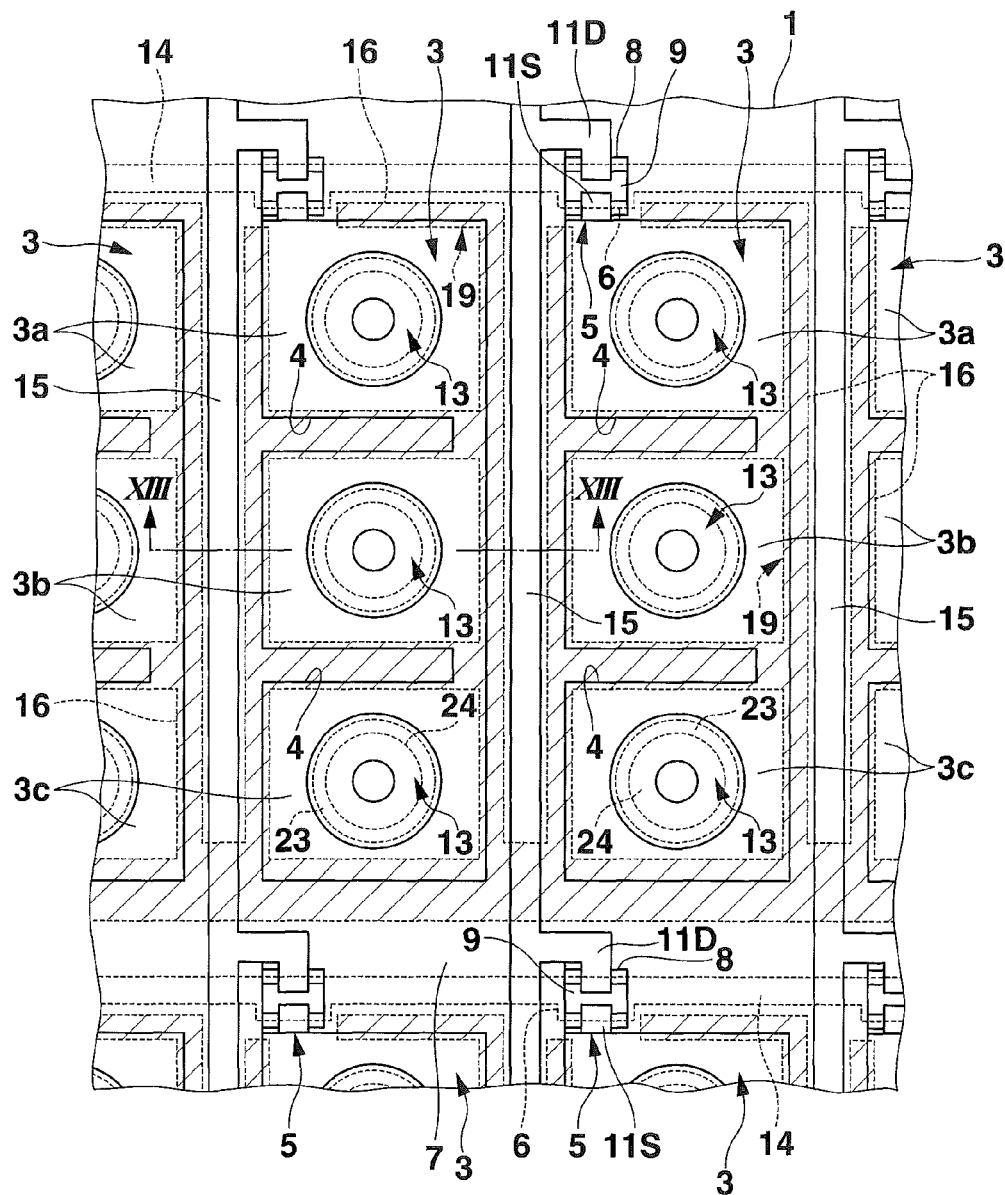
FIG. 12 is a plan view of a back substrate of a liquid crystal display device according to Embodiment 5.
Figure 13:
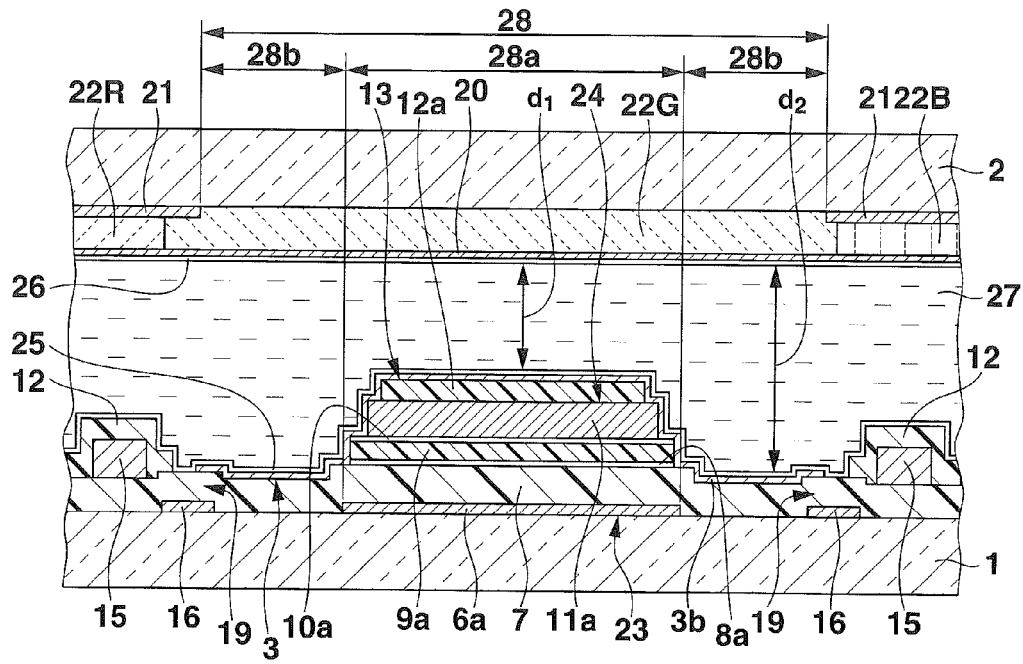
FIG. 13 is an enlarged cross-sectional diagram corresponding to line XIII-XIII of FIG. 12 of a liquid crystal display device according to Embodiment 1.

FIG. 12 to FIG. 15 illustrate Embodiment 5 of the present invention. FIG. 12 is plan view of a section of the other substrate (back substrate) of a liquid crystal display device, and FIG. 13 is an enlarged cross-sectional diagram corresponding to line XIII-XIII of FIG. 12 of the liquid crystal display device. Furthermore, in FIG. 12 and FIG. 13, those items corresponding to the above-described Embodiment 1 are given the same call-outs as Embodiment 1, and descriptions thereof are omitted.

The liquid crystal display device of the present embodiment correspondingly provides on the internal side of the back substrate 1 provided with the plurality of pixel electrodes 3 a plurality of convex sections 13 formed in a shape having an area equivalent to a predetermined percentage of the area of each of the square-shaped electrode segments 3a, 3b, and 3c, such as, for example, 25 to 50% of the area of the square-shaped electrode segments 3a, 3b, and 3c. Further, the liquid crystal display device provides first and second reflective films 23 and 24 for forming a reflective display section 28a and a transmissive display section 28b aside from the reflective display section 28a, per pixel of the plurality of pixels 28. The reflective display section 28a reflects and outputs to the observation side (the outer surface side of the front substrate 2) the light incident on the section corresponding to the convex section 13 on the internal side of the back substrate 1. The transmissive display section 28b transmits and outputs to the observation side the incident light from the side opposite the observation side (the outer surface side of the back substrate 1). The other components are the same as those of the above-described Embodiment 1.

In the present embodiment, the convex section 13 comprises a layered film of the same material as that of the above-described Embodiment 1 and is substantially formed into a flat top conical shape (a flat top conical shape having a stepped peripheral surface).

Then, in the present embodiment, the liquid crystal display device forms the convex section 13 from a layered film made of films of the same material as all of the plurality of films constituting the TFT 5. Further, the liquid crystal display device forms a portion of the plurality of films constituting the TFT 5 and the formed film of the convex section 13 comprising films of the same material as those films at a film pressure at which a liquid crystal film pressure $d_l$ of the reflective display section 28a is substantially ½ a liquid crystal film pressure $d_2$ of the transmissive display section 14b. The convex section 13 comprises the two films the drain electrode 11D and the source electrode 11S of the plurality of films constituting the TFT 5, and the two films the upper metal film 11a comprising a metal film of the same material as the drain electrode 11D and the source electrode 11S and the upper insulating film 12a comprising an insulating film of the same material as the overcoat insulating film 12 of the formed film of the convex section 13. Further, the liquid crystal display device sets the product Δnd1 of the birefringent anisotropy Δn and the liquid crystal film thickness d1 of the liquid crystal of the reflective display section 28a in which incident light from the observation side is transmitted back and forth through the liquid crystal layer 27 and output to the observation side, to substantially ½ the product Δnd2 of the transmissive display section 14b.

Further, in the present embodiment, of the layered film that forms the convex section 13, the first and second reflective films 23 and 24 are formed from the lower metal film 6a comprising a metal film of the same material as the gate electrode 6 and the scan line 14 of the TFT 5, and the upper metal film 11a comprising a metal film of the same material as the drain electrode 11D and the source electrode 11d.

Of these reflective films 23 and 24, the first reflective film 23 comprising the lower metal film 6a is formed into a circular film having a diameter corresponding to the diameter of the base section of the convex section 13 of the flat top conical shape. Further, the second reflective film 24 comprising the upper metal film 11a is formed into a circular shape having a diameter smaller than that of the first reflective film 23. Of the incident light from the observation side that is transmitted through the liquid crystal layer 27, the second reflective film 24 reflects onto the observation side the light incident on the second reflective film 24. Of the incident light from the observation side that is transmitted through the liquid crystal layer 27, the first reflective film 23 reflects onto the observation side the light incident on the outer peripheral section (the section extending to the periphery of the second reflective film 24) of the first reflective film 23 via the periphery of the second reflective film 24.

That is, of the plurality of regions respectively corresponding to each square-shaped electrode segments 3a, 3b, and 3c of the pixel electrode 3 of the pixel 28, the reflective display section 28a is formed from the circular region corresponding to the convex section 13 at the center of these regions. Further, the transmissive display section 28b is formed from the region surrounding the reflective display section 28a of the plurality of regions.

This liquid crystal display device provides the plurality of pixel electrodes 3, the TFT 5, the scan line 14, the signal line 15, and the plurality of convex sections 13 on the internal side of the back substrate 1 of the pair of substrates 1 and 2, on the opposite side of the observation side. Then, the liquid crystal display device forms the convex section 13 into a shape having an area of a predetermined percentage of the area of the pixel 28. The liquid crystal display device provides the reflective films 23 and 24 for forming per pixel of the plurality of pixels 28 the reflective display section 28a that reflects and outputs to the observation side the light incident on the section corresponding to the convex section 13 from the observation side, and the transmissive display section 28b aside from the reflective display section 28a that transmits and outputs to the observation side the incident light from the side opposite the observation side This makes it possible for the liquid crystal display device to perform reflective display utilizing outside light, which is the light of the operating environment of the liquid crystal display device, and transmissive display utilizing the light illuminated from a surface light source (not shown) arranged on the side opposite the observation side of the liquid crystal display device.

Further, in the present embodiment, the liquid crystal display device forms the reflective films 23 and 24 from the lower metal film 6a comprising a metal film of the same material as the gate electrode 6 and the scan line 14 of the TFT 5, and the upper metal film 11a comprising a metal film of the same material as the drain electrode 11D and the source electrode 11S, of the layered film that forms the convex section 13. This makes it possible for the liquid crystal display device to form the reflective films 23 and 24 utilizing the TFT 5 formation process, without increasing the production cost of the liquid crystal display device.

Figure 14:
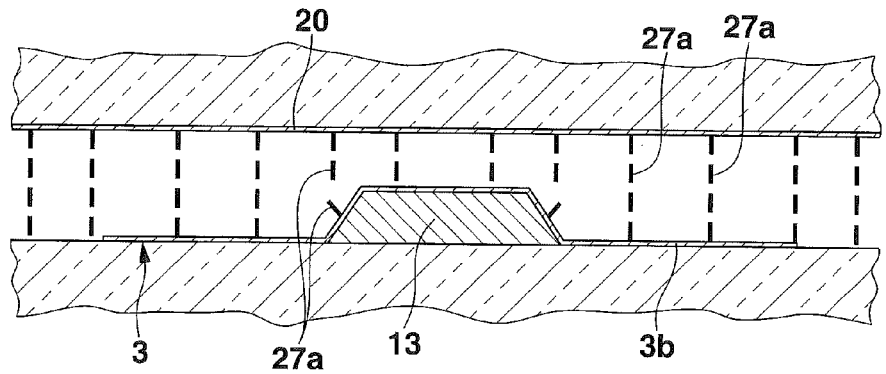
FIG. 14 is an exemplary cross-sectional diagram showing the orientation state of liquid crystal molecules when voltage in not applied in a liquid crystal display device according to Embodiment 5.
Figure 15:
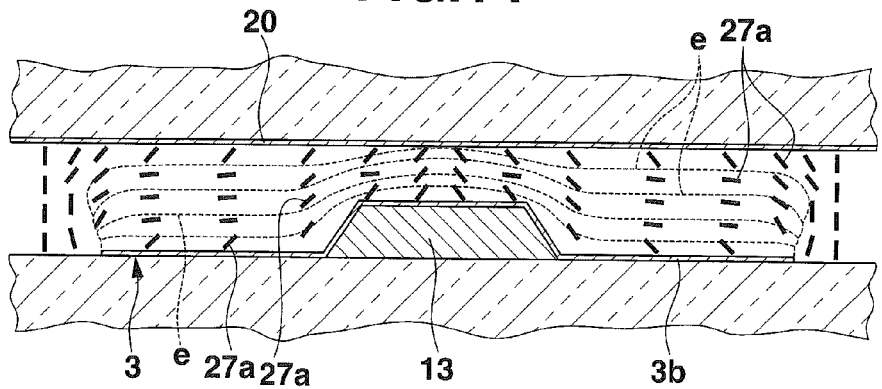
FIG. 15 is an exemplary cross-sectional diagram showing the orientation state of liquid crystal molecules when voltage is applied in a liquid crystal display device according to Embodiment 5.

FIG. 14 is an exemplary cross-sectional diagram showing the orientation state of the liquid crystal molecules when voltage is not applied between the electrodes 3 and 20 of a single pixel 28 of the liquid crystal display device of the present embodiment. FIG. 15 is an exemplary cross-sectional diagram showing the orientation state of the liquid crystal molecules when voltage is applied between the electrodes 3 and 20 of the single pixel 28. Furthermore, in FIG. 14 and FIG. 15, the convex section 13 is omitted.

As shown in FIG. 14, when voltage is not applied between the electrodes 3 and 20, the liquid crystal molecule 27a of the liquid crystal layer 27 is substantially vertically oriented with respect to the surfaces of the substrates 1 and 2 in regions other than the section corresponding to the convex section 13 due to the vertical orientation of the vertical alignment films 25 and 26 respectively provided on the internal sides of the pair of substrates 1 and 2. More specifically, in the section corresponding to the convex section 13, the liquid crystal molecule 27a near the convex section 13 of the back substrate 1 side is oriented in such a manner that its long molecular axis is substantially toward the vertical direction with respect to the top surface and the peripheral surface of he convex section 13. On the other hand, the liquid crystal molecule 27a near the front substrate 2 is substantially vertically oriented with respect to the surface of the front substrate 2.

Further, when voltage is applied between the electrodes 3 and 20, the liquid crystal molecule 27a of each region corresponding to each of the plurality of square-shaped electrode segments 3a, 3b, and 3c of the pixel electrode 3 is guided by the electrical potential distribution near the convex section 13 and the behavior of the liquid crystal molecules in the surrounding area of each pixel section. As a result, the liquid crystal molecule 3a of each region is stably tilted per region toward the center section from the peripheral border section of that region, as shown in FIG. 15.

That is, this liquid crystal display device forms the pixel electrode 3, covering the convex section 13. As a result, the electric fields respectively generated in each region corresponding to each of the square-shaped electrode segments 3a, 3b, and 3c of the pixel electrode 3 when voltage is applied between the electrodes 3 and 20 are electric fields in which the electric potential of the section corresponding to the convex section 13, with respect to the electric potential of other sections of the region, is biased toward the front substrate 2 side, as the equipotential line e shows in FIG. 15.

As a result, the liquid crystal molecule 27a, per region corresponding to each of the square-shaped electrode segments 3a, 3b, and 3c of the pixel electrode 3, stably tilts toward the center section from the peripheral border section of the region along the equipotential line e, with the section corresponding to the center of the convex section 13 as the focal point of the tilting direction.

In consequence, this liquid crystal display device stably tilts the liquid crystal molecule 27a toward the center section from the border section of the pixel 28 when voltage is applied between the electrodes 3 and 20 for each of the plurality of pixels 28. This makes it possible for the liquid crystal display device to display a good quality image without graininess, with either the reflective display or the transmissive display.

Additionally, the liquid crystal display device forms the pixel electrode 3, covering the convex section 13. This makes it possible for the liquid crystal display device to even more stably tilt the liquid crystal molecule 27a toward the center section from the border section of the pixel 28 when the voltage is applied, and thereby display an image of even higher quality.

Figure 10:
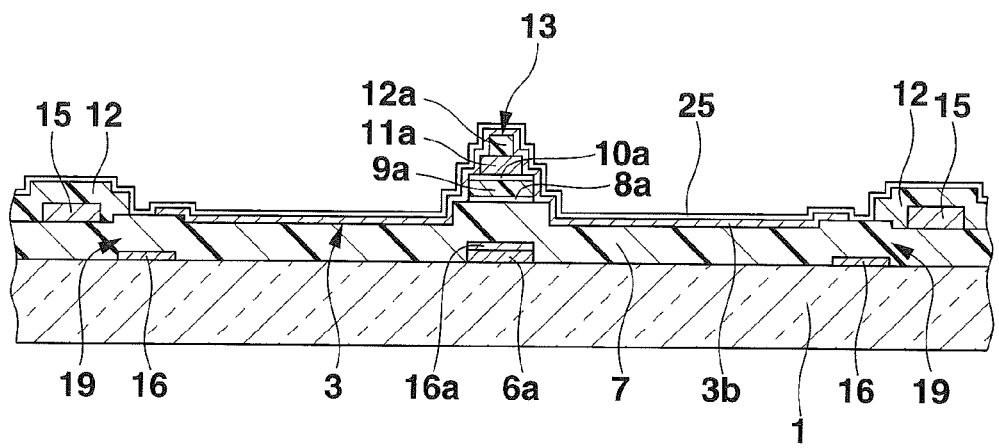
FIG. 10 is a cross-sectional diagram of a back substrate of a liquid crystal display device according to a modified embodiment.

Furthermore, while the convex section 13 is formed from a layered film made of films of the same material as all of the plurality of films constituting the TFT 5 in the present embodiment, the convex section 13 may be formed from a layered film of the same material as that of one of the embodiments shown in FIG. 9, FIG. 10, and FIG. 11.

Further, the liquid crystal display device may form the convex section 13 from a layered film made of films of the same material as a portion of the plurality of films constituting the TFT 5. In this case, the liquid crystal display device forms the convex section 13 from a layered film that includes at least, of the plurality of films constituting he TFT 5, the lower metal film 6a comprising a metal film of the same material as the gate electrode 6 and the scan line 14, or the upper metal film 11a comprising a metal film of the same material as the drain electrode 11D and the source electrode 11S.

Embodiment 6

Figure 16:
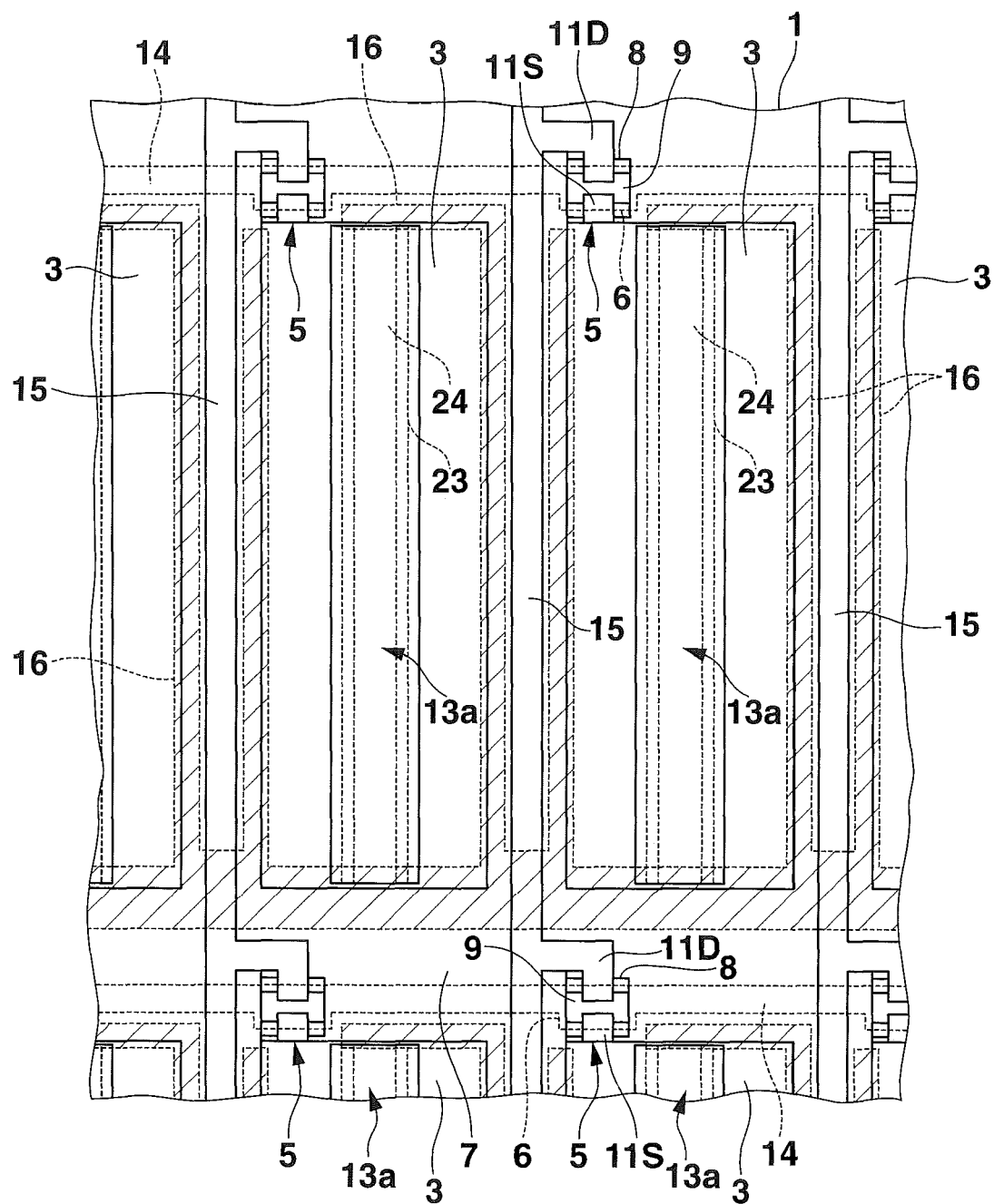
FIG. 16 is a plan view of a back substrate of a liquid crystal display device according to Embodiment 6.

FIG. 16 is a plan view of a section of the other substrate (back substrate) of the liquid crystal display device indicated in Embodiment 6 of the present invention. The liquid crystal display device of the present embodiment forms the long and narrow convex section 13a across the entire length in the longitudinal direction of the pixel electrode 3 of the above-described Embodiment 2 into a shape having an area of a predetermined percentage (25 to 50%, for example) of the area of the pixel 28. Further, the liquid crystal display device of the present embodiment provides the convex section 13a with a structure comprising, similar to the convex section 13 of the above described Embodiment 5, at least one of the first and second reflective films 23 and 24 for forming per pixel of the plurality of pixels 28 the reflective display section 28a and the transmissive display section 28b aside from the reflective display section 28a.

Furthermore, in the above-described Embodiments 5 and 6, the liquid crystal display device forms the reflective films 23 and 24 from at least one of the metal films forming he convex sections 13 and 13a. Note that the liquid crystal display device may form the convex sections 13 and 13a from a plurality of transparent films, and may provide the reflective film for forming the reflective display section 28a and the transmissive display section 28b per pixel of the plurality of pixels 28 on the outer surface of the back substrate 1.

As discussed above, the liquid crystal display device of the present invention comprises: a pair of substrates arranged opposite each other with a gap; at least one opposing electrode formed on an internal side of one of the mutually opposed pair of substrates, a plurality of pixel electrodes aligned in a matrix shape on an internal side of he other substrate, the plurality of pixel electrodes having predefined regions, opposed to he opposing electrode and defining a plurality of pixels; a plurality of thin film transistors associated with the plurality of pixel electrodes on the internal side of the other substrate, and the plurality of thin film transistors each connected to the corresponding pixel electrode; a plurality of scan lines and signal lines on the internal side of the other substrate, supplying gate signals and data signals to the thin film transistor; a plurality of convex sections each formed on the internal side of the other substrate so as to be located substantially on a center part of each of the plurality of pixels and protruding farther than he other regions of the pixel electrodes; vertical alignment films on the respective internal sides of the pair of substrates; and a liquid crystal layer, having negative dielectric anisotropy, and interposed in the gap between the pair of substrates.

In the liquid crystal display device of the present invention, it is preferable that the pixel electrodes are formed so as to cover the convex section. More, it is preferable that each of the plurality of pixel electrodes comprises substantially separate electrode segments, and the convex section is located substantially on a center part of each of the electrode segments. Preferably, that each of the plurality of pixel electrodes has a long and narrow rectangular shape, and has a slit dividing the rectangular shape into a plurality of square-shaped electrode segments aligned in the longitudinal direction and the convex section is located substantially on a center part of each of the electrode segments. Preferably, that the convex section comprises a film stack made up of at least two films of the same materials as at least two of the plurality of films constituting a thin film transistor. Preferably, the liquid crystal display device of the present invention further comprising a capacitive electrode formed on the internal side of the one substrate and opposed to a peripheral section of each pixel electrode via an insulating film, the capacitive electrode constituting a compensation capacitor with each of the pixel electrodes, wherein the convex section comprises a film stack made up of at least one film of the same material as at least one of the films constituting the plurality of thin film transistors and a film of the same material as the capacitive electrode. Preferably, the convex section is formed to have a circular cross-section taken in a plane parallel to the surfaces of the substrate.

Further, the liquid crystal display device of the present invention comprises: a pair of substrates arranged opposite each other with a gap; at least one opposing electrode formed on an internal side of one of the mutually opposed pair of substrates, a plurality of pixel electrodes aligned in a matrix shape on an internal side of the other substrate, the plurality of pixel electrodes having predefined regions, opposed to the opposing electrode and defining a plurality of pixels; a plurality of thin film transistors associated with the plurality of pixel electrodes on the internal side of the other substrate, and the plurality of thin film transistors each connected to the corresponding pixel electrode; a plurality of scan lines and signal lines on the internal side of the other substrate, supplying gate signals and data signals to the thin film transistor; a plurality of convex sections each formed on the internal side of the other substrate so as to be located substantially on a center part of each of the plurality of pixels made up of at least two films of the same materials as at least two of the plurality of films constituting a thin film transistor and protruding toward the one substrate farther than the other regions of internal side of each of the pixel electrodes; a vertical alignment film on the respective internal sides of the pair of substrates; and a liquid crystal layer, having negative dielectric anisotropy, and interposed in the gap between the pair of substrates. In the liquid crystal display device, preferably, each of the plurality of pixel electrodes is formed so as to cover the convex section. Preferably, each of the plurality of pixel electrodes comprises a conductive film formed in a long and narrow rectangular shape. Preferably, each of the plurality of pixel electrodes comprises a conductive film comprising a first, longitudinal axis and a second, transverse axis and thereby having a narrow rectangular shape, and the convex section is located substantially on a center of the first, longitudinal axis and across the entire length of the second, transverse axis. It is preferable that the liquid crystal display device further comprising a capacitive electrode formed on the internal side of the one substrate and opposed to a peripheral section of each of the plurality of pixel electrodes via an insulating film, the capacitive electrode constituting a compensation capacitor with each of the pixel electrodes, wherein the convex section comprises a film stack made up of at least two films, each of which is of the same material as one of the films constituting each of the plurality of thin film transistors and a film constituting the capacitive electrode.

Further, a liquid crystal display device of the present invention comprises: a pair of substrates arranged opposite each other with a gap; at least one opposing electrode formed on an internal side of one of the mutually opposed pair of substrates, a plurality of pixel electrodes aligned in a matrix shape on an internal side of the other substrate, the plurality of pixel electrodes having predefined regions, opposed to the opposing electrode and defining a plurality of pixels; a plurality of thin film transistors associated with the plurality of pixel electrodes on the internal side of the other substrate, and the plurality of thin film transistors each connected to the corresponding pixel electrode; a plurality of scan lines and signal lines on the internal side of the other substrate, supplying gate signals and data signals to the thin film transistor; a plurality of convex sections each formed on the internal side of the other substrate so as to be located substantially on a center part of each of the plurality of pixels, having an area of predetermined ratio with respect to an area of the electrode, protruding toward the one substrate farther than the other regions of internal side of each of the pixel electrodes, and reflecting a light entering from an observation side; a vertical alignment film on the respective internal sides of the pair of substrates; and a liquid crystal layer, having negative dielectric anisotropy, and interposed in the gap between the pair of substrates. Preferably, the convex section comprises a reflective film making up a reflective display section reflecting a light entering from the observation side and emitting the reflected light to the observation side and a transmissive display section transmitting a light entering from a side opposite to the observation side and allowing the light to pass therethrough to the observation side. Preferably, each of the plurality of pixel electrodes is formed into a narrow rectangular shape, and comprises a conductive film divided into a plurality of substantially square-shaped electrode segments, and the convex section is located substantially on a center part of each of the electrode segments. Preferably, each of the plurality of pixel electrodes comprises a conductive film having a slit dividing the rectangular shape into a plurality of substantially square-shaped electrode segments aligned in the longitudinal direction, and the convex section is located substantially on a center part of each of the electrode segments, and is formed to have a circular cross-section taken in a plane parallel to the surfaces of the substrate. Preferably, the convex section comprises a film stack made up of at least two films of the same materials as at least two of the plurality of films constituting a thin film transistor. The liquid crystal display device of the present invention comprises a capacitive electrode formed on the internal side of the one substrate and opposed to a peripheral section of each pixel electrode via an insulating film, the capacitive electrode constituting a compensation capacitor with each of the pixel electrodes, wherein the convex section comprises a film stack made up of at least one film of the same material as one of the films constituting each of the plurality of thin film transistors and a film of the same material as a film constituting the capacitive electrode. Preferably, the reflective film is formed of at least one of metal films making up the film stack constituting the convex section. Preferably, each of the pixel electrodes comprises a conductive film comprising a first, longitudinal axis and a second, transverse axis and thereby having a narrow rectangular shape, and the convex section is located substantially on a center of the first, longitudinal axis and across the entire length of the second, transverse axis.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2006-263227 filed on Sep. 27, 2006 and including specification, claims, drawings and summary. The disclosure of the above Japanese Patent Application is incorporated herein by reference in its entirety.

What is claimed is:

1. A liquid crystal display device comprising:
 a pair of substrates arranged opposite each other with a gap therebetween;
 at least one opposing electrode formed on an internal side of one of the mutually opposed pair of substrates;
 a plurality of pixel electrodes aligned in a matrix shape on an internal side of the other substrate, the plurality of pixel electrodes having predefined regions, opposed to the opposing electrode and defining a plurality of pixels;
 a plurality of thin film transistors associated with the plurality of pixel electrodes on the internal side of the other substrate, wherein each of the plurality of thin film transistors is connected to a corresponding pixel electrode, and comprises a plurality of films;
 a plurality of scan lines and signal lines provided on the internal side of the other substrate, which supply gate signals and data signals to the thin film transistors;
 a plurality of convex sections each formed on the internal side of the other substrate so as to be located substantially on a center part of each of the plurality of predetermined regions provided in each of the plurality of pixels and protruding farther than the other regions of the pixel electrodes, wherein each convex section comprises a film stack including at least two films of a same material as at least two of the plurality of films of the thin film transistors;
 vertical alignment films provided on the respective internal sides of the pair of substrates; and
 a liquid crystal layer having negative dielectric anisotropy and which is interposed in the gap between the pair of substrates.

2. The liquid crystal display device according to claim 1, wherein the pixel electrodes are formed so as to cover the convex sections.

3. The liquid crystal display device according to claim 1, wherein each of the plurality of pixel electrodes comprises substantially separate electrode segments, and the convex sections are respectively located substantially on a center part of each of the electrode segments.

4. The liquid crystal display device according to claim 1, wherein each of the plurality of pixel electrodes has a long and narrow rectangular shape, and has a slit dividing the rectangular shape into a plurality of square-shaped electrode segments aligned in the longitudinal direction, and wherein the convex sections are respectively located substantially on a center part of each of the electrode segments.

5. The liquid crystal display device according to claim 1, further comprising a capacitive electrode formed on the internal side of the one substrate and opposed to a peripheral section of each pixel electrode via an insulating film, the capacitive electrode constituting a compensation capacitor with each of the pixel electrodes, wherein the film stack includes a film of a same material as the capacitive electrode.

6. The liquid crystal display device according to claim 1, wherein each convex section is formed to have a circular cross-section taken in a plane parallel to the surfaces of the substrates.

7. A liquid crystal display device comprising:
a pair of substrates arranged opposite each other with a gap therebetween;
at least one opposing electrode formed on an internal side of one of the mutually opposed pair of substrates;
a plurality of pixel electrodes aligned in a matrix shape on an internal side of the other substrate, the plurality of pixel electrodes having predefined regions, opposed to the opposing electrode and defining a plurality of pixels;
a plurality of thin film transistors associated with the plurality of pixel electrodes on the internal side of the other substrate, wherein each of the plurality of thin film transistors is connected to a corresponding pixel electrode, and comprises a plurality of films;
a plurality of scan lines and signal lines provided on the internal side of the other substrate, which supply gate signals and data signals to the thin film transistors;
a plurality of convex sections each formed on the internal side of the other substrate so as to be located substantially on a center part of each of the plurality of pixels, wherein each convex section comprises a film stack including at least two films of a same material as at least two of the plurality of films of the thin film transistors, and protrudes toward the one substrate farther than other regions of an internal side of each of the pixel electrodes;
a vertical alignment film provided on the respective internal sides of the pair of substrates,
a liquid crystal layer having negative dielectric anisotropy, and which is interposed in the gap between the pair of substrates; and
a capacitive electrode formed on the internal side of the one substrate and opposed to a peripheral section of each of the plurality of pixel electrodes via an insulating film, the capacitive electrode constituting a compensation capacitor with each of the pixel electrodes, wherein a film constituting the capacitive electrode is of the same material as the at least two films of the film stack of each convex section.

8. The liquid crystal display device according to claim 7, wherein each of the plurality of pixel electrodes is formed so as to cover the corresponding convex section.

9. The liquid crystal display device according to claim 7, wherein each of the plurality of pixel electrodes comprises a conductive film formed in a long and narrow rectangular shape.

10. The liquid crystal display device according to claim 7, wherein each of the plurality of pixel electrodes comprises a conductive film comprising a longitudinal first axis and a transverse second axis, thereby having a narrow rectangular shape, and wherein the convex sections are respectively located substantially on a center of each longitudinal first axis and across an entire length of each transverse second axis.

11. A liquid crystal display device comprising:
a pair of substrates arranged opposite each other with a gap therebetween;
at least one opposing electrode formed on an internal side of one of the mutually opposed pair of substrates;
a plurality of pixel electrodes aligned in a matrix shape on an internal side of the other substrate, the plurality of pixel electrodes having predefined regions, opposed to the opposing electrode and defining a plurality of pixels;
a plurality of thin film transistors associated with the plurality of pixel electrodes on the internal side of the other substrate, wherein each of the plurality of thin film transistors is connected to a corresponding pixel electrode, and comprises a plurality of films;
a plurality of scan lines and signal lines provided on the internal side of the other substrate, supplying gate signals and data signals to the thin film transistor;
a plurality of convex sections each formed on the internal side of the other substrate so as to be located substantially on a center part of each of the plurality of pixels, having an area of predetermined ratio with respect to an area of the electrode, protruding toward the one substrate farther than other regions of an internal side of each of the pixel electrodes, and reflecting a light entering from an observation side, wherein each convex section comprises a film stack including at least two films of a same material as at least two of the plurality of films of the thin film transistors;
a vertical alignment film provided on the respective internal sides of the pair of substrates; and
a liquid crystal layer having negative dielectric anisotropy, and which is interposed in the gap between the pair of substrates.

12. The liquid crystal display device according to claim 11, wherein each convex section comprises a reflective film making up a reflective display section which reflects a light entering from the observation side and which emits the reflected light to the observation side, and a transmissive display section which transmits a light entering from a side opposite to the observation side and which allows the light to pass therethrough to the observation side.

13. The liquid crystal display device according to claim 11, wherein each of the plurality of pixel electrodes is formed into a narrow rectangular shape, and comprises a conductive film divided into a plurality of substantially square-shaped electrode segments, and wherein the convex sections are respectively located substantially on a center part of each of the electrode segments.

14. The liquid crystal display device according to claim 11, wherein each of the plurality of pixel electrodes comprises a conductive film having a slit dividing the rectangular shape into a plurality of substantially square-shaped electrode segments aligned in the longitudinal direction, and wherein the convex sections are respectively located substantially on a center part of each of the electrode segments, and are formed to have a circular cross-section taken in a plane parallel to the surfaces of the substrate.

15. The liquid crystal display device according to claim 11, further comprising a capacitive electrode formed on the internal side of the one substrate and opposed to a peripheral section of each pixel electrode via an insulating film, the capacitive electrode constituting a compensation capacitor with each of the pixel electrodes,
wherein the film stack includes a film of a same material as a film constituting the capacitive electrode.

16. The liquid crystal display device according to claim 12, wherein the reflective film is formed of at least one of metal films included in the film stack of each convex section.

17. The liquid crystal display device according to claim 11, wherein each of the pixel electrodes comprises a conductive film comprising a first, longitudinal first axis and a transverse second axis, thereby having a narrow rectangular shape, and wherein the convex sections are respectively located substantially on a center of each longitudinal first axis and across an entire length of each transverse second axis.

18. A liquid crystal display device comprising:
a pair of substrates arranged opposite each other with a gap therebetween;
at least one opposing electrode formed on an internal side of one of the mutually opposed pair of substrates;
a plurality of pixel electrodes aligned in a matrix shape on an internal side of the other substrate, the plurality of pixel electrodes having predefined regions, opposed to the opposing electrode and defining a plurality of pixels;
a plurality of thin film transistors associated with the plurality of pixel electrodes on the internal side of the other substrate, wherein each of the plurality of thin film transistors is connected to a corresponding pixel electrode, and comprises a plurality of films;
a plurality of scan lines and signal lines provided on the internal side of the other substrate, which supply gate signals and data signals to the thin film transistors;
a plurality of convex sections each formed on the internal side of the other substrate so as to be located substantially on a center part of each of the plurality of predetermined regions provided in each of the plurality of pixels and protruding farther than the other regions of the pixel electrodes;
vertical alignment films provided on the respective internal sides of the pair of substrates;
a liquid crystal layer having negative dielectric anisotropy and which is interposed in the gap between the pair of substrates; and
a capacitive electrode formed on the internal side of the one substrate and opposed to a peripheral section of each pixel electrode via an insulating film, the capacitive electrode constituting a compensation capacitor with each of the pixel electrodes,
wherein the convex section comprises a film stack including at least one film of a same material as at least one of the films of the thin film transistors and a film of a same material as the capacitive electrode.

19. The liquid crystal display device according to claim 18, wherein the pixel electrodes are formed so as to cover the convex sections.

20. The liquid crystal display device according to claim 18, wherein each of the plurality of pixel electrodes comprises substantially separate electrode segments, and the convex sections are respectively located substantially on a center part of each of the electrode segments.

21. The liquid crystal display device according to claim 18, wherein each of the plurality of pixel electrodes has a long and narrow rectangular shape, and has a slit dividing the rectangular shape into a plurality of square-shaped electrode segments aligned in the longitudinal direction, and wherein the convex sections are respectively located substantially on a center part of each of the electrode segments.

22. The liquid crystal display device according to claim 18, wherein each convex section is formed to have a circular cross-section taken in a plane parallel to the surfaces of the substrates.

23. A liquid crystal display device comprising:
a pair of substrates arranged opposite each other with a gap therebetween;
at least one opposing electrode formed on an internal side of one of the mutually opposed pair of substrates;
a plurality of pixel electrodes aligned in a matrix shape on an internal side of the other substrate, the plurality of pixel electrodes having predefined regions, opposed to the opposing electrode and defining a plurality of pixels;
a plurality of thin film transistors associated with the plurality of pixel electrodes on the internal side of the other substrate, wherein each of the plurality of thin film transistors is connected to a corresponding pixel electrode, and comprises a plurality of films;
a plurality of scan lines and signal lines provided on the internal side of the other substrate, supplying gate signals and data signals to the thin film transistor;
a plurality of convex sections each formed on the internal side of the other substrate so as to be located substantially on a center part of each of the plurality of pixels, having an area of predetermined ratio with respect to an area of the electrode, protruding toward the one substrate farther than the other regions of internal side of each of the pixel electrodes, and reflecting a light entering from an observation side;
a vertical alignment film provided on the respective internal sides of the pair of substrates;
a liquid crystal layer having negative dielectric anisotropy, and which is interposed in the gap between the pair of substrates; and
a capacitive electrode formed on the internal side of the one substrate and opposed to a peripheral section of each pixel electrode via an insulating film, the capacitive electrode constituting a compensation capacitor with each of the pixel electrodes,
wherein each convex section comprises a film stack including at least one film of a same material as one of the films of the thin film transistors and a film of a same material as a film of the capacitive electrode.

24. The liquid crystal display device according to claim 23, wherein each convex section comprises a reflective film making up a reflective display section which reflects a light entering from the observation side and which emits the reflected light to the observation side, and a transmissive display section which transmits a light entering from a side opposite to the observation side and which allows the light to pass therethrough to the observation side.

25. The liquid crystal display device according to claim 23, wherein each of the plurality of pixel electrodes is formed into a narrow rectangular shape, and comprises a conductive film divided into a plurality of substantially square-shaped electrode segments, and wherein the convex sections are respectively located substantially on a center part of each of the electrode segments.

26. The liquid crystal display device according to claim 23, wherein each of the plurality of pixel electrodes comprises a conductive film having a slit dividing the rectangular shape into a plurality of substantially square-shaped electrode segments aligned in the longitudinal direction, and wherein the convex sections are respectively located substantially on a center part of each of the electrode segments, and are formed to have a circular cross-section taken in a plane parallel to the surfaces of the substrates.

27. The liquid crystal display device according to claim 24, wherein the reflective film is formed of at least one of metal films included in the film stack of each convex section.

28. The liquid crystal display device according to claim 23, wherein each of the pixel electrodes comprises a conductive film comprising a longitudinal first axis and a transverse second axis, thereby having a narrow rectangular shape, and wherein the convex sections are respectively located substantially on a center of each longitudinal first axis and across an entire length of each transverse second axis.

* * * * *